(12) United States Patent
Khandelwal et al.

(10) Patent No.: US 8,228,865 B2
(45) Date of Patent: Jul. 24, 2012

(54) METHOD AND APPARATUS FOR OPERATING IN A WIRELESS LOCAL AREA NETWORK BASED ON INFORMATION FROM A WIRELESS WIDE AREA NETWORK

(75) Inventors: Deepak Khandelwal, San Diego, CA (US); Amit Gil, San Diego, CA (US); Rotem Cooper, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 379 days.

(21) Appl. No.: 11/400,440

(22) Filed: Apr. 7, 2006

(65) Prior Publication Data

US 2007/0237121 A1    Oct. 11, 2007

(51) Int. Cl.
*H04W 4/00* (2009.01)
(52) U.S. Cl. .................................. 370/330; 370/431
(58) Field of Classification Search .............. 370/330, 370/431
See application file for complete search history.

(56) References Cited

U.S. PATENT DOCUMENTS

| | | | |
|---|---|---|---|
| 6,405,048 B1 | 6/2002 | Haartsen | |
| 6,556,825 B1 | 4/2003 | Mansfield | |
| 2003/0081654 A1* | 5/2003 | Cooklev et al. | 375/132 |
| 2004/0039817 A1* | 2/2004 | Lee et al. | 709/225 |
| 2004/0100932 A1* | 5/2004 | Shiota et al. | 370/338 |
| 2004/0137905 A1 | 7/2004 | Jeong et al. | |
| 2004/0214539 A1* | 10/2004 | Rajamani et al. | 455/161.1 |
| 2004/0223477 A1 | 11/2004 | Iwasaki et al. | |
| 2005/0193150 A1* | 9/2005 | Buckley et al. | 709/250 |
| 2005/0249171 A1* | 11/2005 | Buckley et al. | 370/338 |
| 2005/0255851 A1* | 11/2005 | Schreiber | 455/453 |
| 2006/0026017 A1* | 2/2006 | Walker | 705/1 |
| 2006/0079224 A1* | 4/2006 | Welnick et al. | 455/432.1 |
| 2006/0213967 A1* | 9/2006 | Chuang et al. | 235/375 |

FOREIGN PATENT DOCUMENTS

| | | | |
|---|---|---|---|
| EP | 1209863 A2 * | 5/2002 | |
| JP | 2002159043 A | 5/2002 | |
| JP | 2003512768 A | 4/2003 | |
| JP | 2004229278 A | 8/2004 | |
| JP | 2004274723 A | 9/2004 | |
| WO | WO0130025 A1 | 4/2001 | |
| WO | WO2005001702 A2 | 1/2005 | |
| WO | WO2005109934 A1 | 11/2005 | |

OTHER PUBLICATIONS

International Search Report and Written Opinion—PCT/US2007/066170, International Search Authority—European Patent Office—Sep. 21, 2007.

* cited by examiner

*Primary Examiner* — Jae Y Lee
(74) *Attorney, Agent, or Firm* — Howard H. Seo; Kristine U Ekwueme (57) ABSTRACT

Techniques to efficiently search for a WLAN are described. A terminal receives country information from a wireless wide area network (WWAN), which may be a cellular network or a broadcast network. This country information may be a Mobile Country Code (MCC) that is broadcast by the WWAN. The MCC identifies the country in which the WWAN is deployed. The terminal then performs active scan for a WLAN based on the country information received from the WWAN. For the active scan, the terminal determines a frequency channel and a transmit power level based on the country information. The terminal then transmits a probe request on the frequency channel and at the transmit power level determined based on the country information. The terminal may perform passive scan and/or active scan in accordance with a scan setting.

26 Claims, 5 Drawing Sheets

METHOD AND APPARATUS FOR OPERATING IN A WIRELESS LOCAL AREA NETWORK BASED ON INFORMATION FROM A WIRELESS WIDE AREA NETWORK

BACKGROUND

I. Field

The present disclosure relates generally to communication, and more specifically to techniques for scanning for a wireless local area network (WLAN).

II. Background

WLANs are widely deployed to support wireless communication for terminals, which may be computers, cellular phones, and so on. WLANs are deployed in various locations such as office buildings, coffee shops, malls, airport terminals, and other hot spots where data usage is expected to be high. WLANs allow terminals to obtain data connectivity (e.g., to the Internet) from virtually anywhere in the world.

Many WLANs implement IEEE 802.11, which is a family of standards promulgated by The Institute of Electrical and Electronics Engineers (IEEE). The IEEE 802.11 standards specify the radio interface between access points and terminals and between terminals. Currently, 802.11a, 802.11b and 802.11g standards are widely used. Each IEEE 802.11 standard specifies operation at a specific frequency band (e.g., 2.4 GHz or 5 GHz) using one or more modulation techniques. In the following description, the WLANs are assumed to implement IEEE 802.11.

A terminal may be configured to search for a WLAN whenever the terminal is powered on. This search may be achieved by performing an active scan or a passive scan. For an active scan, the terminal transmits a probe request and waits for a probe response to detect the presence of a WLAN. For a passive scan, the terminal searches for a beacon transmitted by an access point in a WLAN. A beacon is a known transmission that contains pertinent information for a WLAN. An active scan typically consumes less battery power but requires the terminal to have regulatory information so that a probe request can be transmitted in accordance with regulatory requirements. Different countries may impose different regulatory requirements on the range of frequencies on which a WLAN can operate as well as the transmit power level for the terminals. A passive scan typically consumes more battery power but does not require regulatory information. In order to comply with the regulatory requirements for all countries, 802.11d requires the terminal to perform a passive scan first if it does not know the country in which it is located.

It is desirable to discover a WLAN with as little battery power as possible. There is therefore a need in the art for techniques to efficiently search for a WLAN.

SUMMARY

Techniques to efficiently search for a WLAN based on country information from a wireless wide area network (WWAN) are described herein. In an embodiment, a terminal receives country information from a WWAN, which may be a cellular network or a broadcast network. The terminal may receive the country information, e.g., upon being powered up, upon loss of coverage from the WLAN, upon being handed off between the WWAN and WLAN during roaming, and so on. This country information may comprise a Mobile Country Code (MCC) that is broadcast by the WWAN. The MCC identifies the country in which the WWAN is deployed. The terminal then performs an active scan for a WLAN based on the country information received from the WWAN. For the active scan, the terminal determines a frequency channel and a transmit power level based on the country information. The terminal then transmits a probe request/access probe on the frequency channel and at the transmit power level determined based on the country information.

In an embodiment, the terminal is configured with a scan setting and performs passive scan and/or active scan in accordance with the scan setting. The scan setting may direct the terminal to perform passive scan. Alternatively, the scan setting may allow the terminal to perform active scan without passive scan if country information is available.

The techniques described herein may also be used to control operation of a terminal in a WLAN or a wireless personal area network (WPAN) (e.g., a Bluetooth network) based on country information obtained via a WWAN. For example, the terminal may determine a frequency range and/or a transmit power level for the WLAN and/or WPAN based on the country information. The terminal may perform active scan for the WLAN based on the country information. The terminal may also select a frequency range and a frequency hopping pattern or sequence for the Bluetooth network based on the country information.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
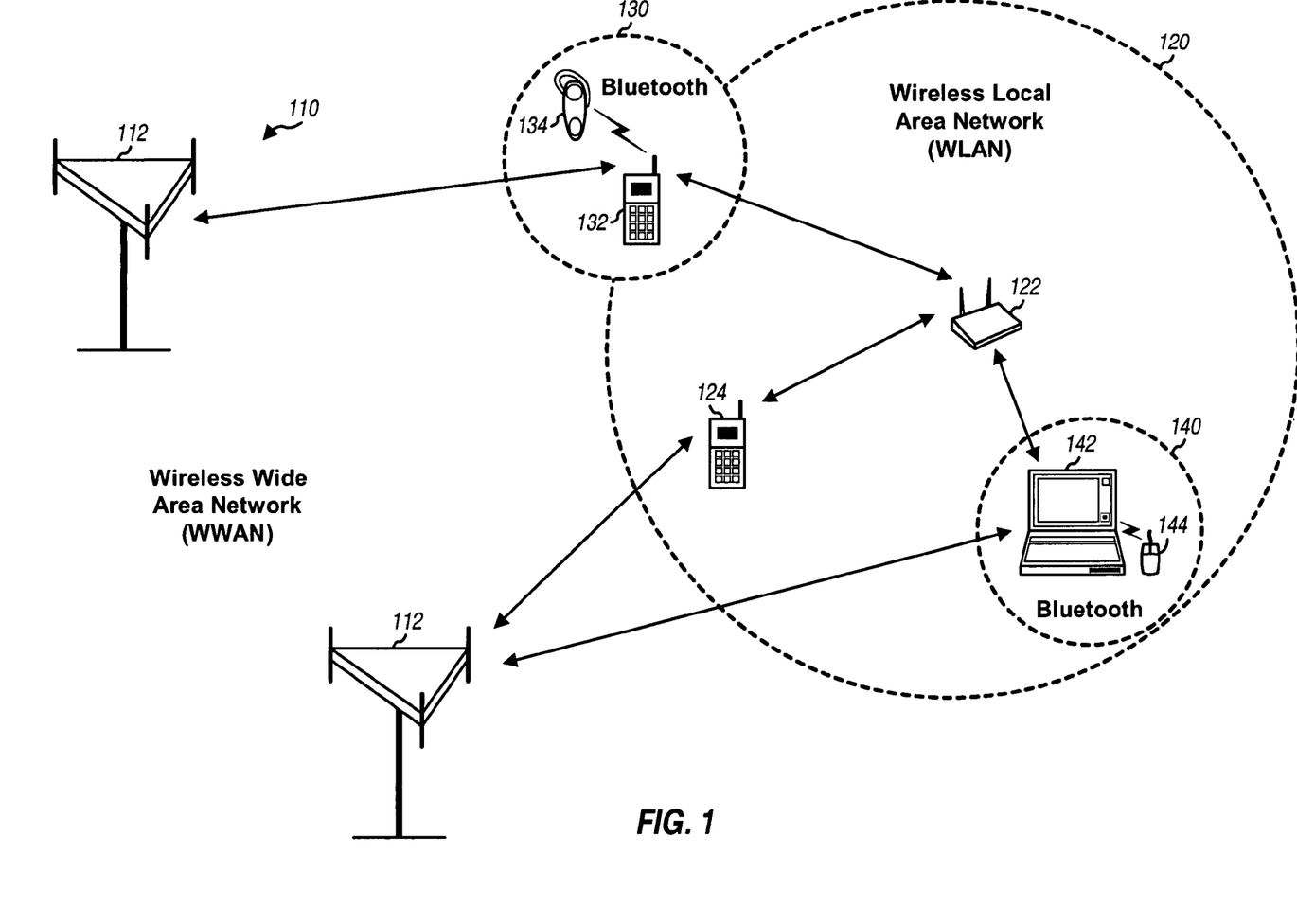
FIG. 1 shows deployment of various wireless networks.

FIG. 1 shows deployment of a wireless wide area network (WWAN) 110, a wireless local area network (WLAN) 120, and wireless personal area networks (WPANs) 130 and 140 within a geographic area.

A WWAN is a wireless network that provides communication coverage for a large geographic area such as, e.g., a city, a state, or an entire country. A WWAN may be a cellular network, a broadcast network, and so on. WWAN 110 may be a cellular network such as (1) a Code Division Multiple Access (CDMA) network that implements IS-95, IS-2000, IS-856 and/or some other CDMA standard, (2) a Universal Mobile Telecommunication System (UMTS) network that implements Wideband-CDMA (W-CDMA), (3) a Global System for Mobile Communications (GSM) network, or (4) some other cellular network. WWAN 110 may also be a terrestrial broadcast network or some other broadcast network. WWAN 110 typically includes many base stations 112 that support communication for terminals within the coverage area of the WWAN. For simplicity, only two base stations 112 are shown in FIG. 1. A base station is generally a fixed station that communicates with the terminals and may also be called a base transceiver station (BTS), a Node B, or some other terminology.

A WLAN is a wireless network that provides communication coverage for a medium geographic area such as, e.g., a building, a mall, an airport terminal, and so on. WLAN 120 may include any number of access points that support wireless communication for any number of WLAN terminals. For simplicity, only one access point 122 and three terminals 124, 132 and 142 are shown in FIG. 1. WLAN terminals may also communicate directly with each other via peer-to-peer communication.

A WPAN is a wireless network that provides communication coverage for a small geographic area (e.g., a home, a building, and so on). WPAN 130 supports communication between terminal 132 and a headset 134. WPAN 140 provides wireless connectivity between terminal 142 and a mouse 144. In general, each WPAN may include any number of communicating devices. WPANs 130 and 140 may implement Bluetooth, which is a short-range radio technology that is adopted as IEEE 802.15 standard.

A terminal may be able to communicate with one or more wireless networks. For the example shown in FIG. 1, terminal 124 can communicate with WWAN 110 and WLAN 120, terminal 132 can communicate with WWAN 110, WLAN 120 and WPAN 130, and terminal 142 can communicate with WWAN 110, WLAN 120 and WPAN 140. A given terminal may thus be a WWAN device (e.g., a cellular phone), a WLAN station, as well as a Bluetooth device. A terminal may also be called a mobile station, an access terminal, a user terminal, a user equipment, a mobile equipment, a station, a subscriber unit, or some other terminology. A terminal may be a cellular phone, a laptop computer, a wireless device, a personal digital assistant (PDA), a wireless modem, a handset, and so on.

WLAN 120 may implement one or more IEEE 802.11 standards and may be deployed in any part of the world. 802.11b and 802.11g operate in the 2.4 GHz band and divide the frequency spectrum from 2400 to 2495 MHz into 14 staggered and overlapping frequency channels, which are numbered as channels 1 through 14. Table 1 lists the 14 frequency channels and their center frequencies. Each frequency channel has a 3 dB bandwidth of 22 MHz. Table 1 also lists the frequency channels that are available for use in different regulatory domains. A regulatory domain may regulate IEEE 802.11 operation for one or multiple countries. One column is provided in Table 1 for each regulatory domain, and each frequency channel supported by that regulatory domain is marked with an "X". For example, frequency channels 1 through 11 are supported in the United States. Table 1 is given in 802.11b standard.

TABLE 1

| Frequency Channels | | Regulatory Domains | | | | | |
|---|---|---|---|---|---|---|---|
| Channel Number | Center Frequency | FCC USA | IC Canada | ETSI Europe | Spain | France | MKK Japan |
| 1 | 2412 | X | X | X | — | — | — |
| 2 | 2417 | X | X | X | — | — | — |
| 3 | 2422 | X | X | X | — | — | — |
| 4 | 2427 | X | X | X | — | — | — |
| 5 | 2432 | X | X | X | — | — | — |

TABLE 1-continued

| Frequency Channels | | Regulatory Domains | | | | | |
|---|---|---|---|---|---|---|---|
| Channel Number | Center Frequency | FCC USA | IC Canada | ETSI Europe | Spain | France | MKK Japan |
| 6 | 2437 | X | X | X | — | — | — |
| 7 | 2442 | X | X | X | — | — | — |
| 8 | 2447 | X | X | X | — | — | — |
| 9 | 2452 | X | X | X | — | — | — |
| 10 | 2457 | X | X | X | X | X | — |
| 11 | 2462 | X | X | X | X | X | — |
| 12 | 2467 | — | — | X | — | X | — |
| 13 | 2472 | — | — | X | — | X | — |
| 14 | 2484 | — | — | — | — | — | X |

Table 2 lists the constraints on transmit power level for WLAN stations imposed by some regulatory domains. A WLAN station may be a terminal or an access point. Table 2 is also given in 802.11b standard.

TABLE 2

| Maximum Output Power | Geographic Location | Compliance Document |
|---|---|---|
| 1000 mW | USA | FCC 15.247 |
| 100 mW (EIRP) | Europe | ETS 300-328 |
| 10 mW/MHz | Japan | MPT Article 49-20 |

Tables 1 and 2 give the frequency and transmit power requirements for the 2.4 GHz band. The frequency and transmit power requirements for the 5 GHz band are given in 802.11a. Other countries may use other frequency channels and/or other transmit power levels that are not covered in the IEEE 802.11 standards. Hence, Tables 1 and 2 are not exhaustive for all countries in which the techniques described herein may be used.

Some IEEE 802.11 standards (e.g., 802.11 and 802.11b) support frequency hopping. The frequency hopping pattern for each regulatory domain is determined by the frequency channels available for that regulatory domain.

A WLAN terminal may be enabled for operation across different regulatory domains. This feature is particularly desirable for a mobile terminal that may travel to different countries governed by different regulatory domains. In order to comply with regulatory requirements, the terminal is required to ascertain the country in which it is located before transmitting to an access point or another terminal. IEEE 802.11 provides a mechanism for disseminating regulatory information to WLAN terminals.

Figure 2:
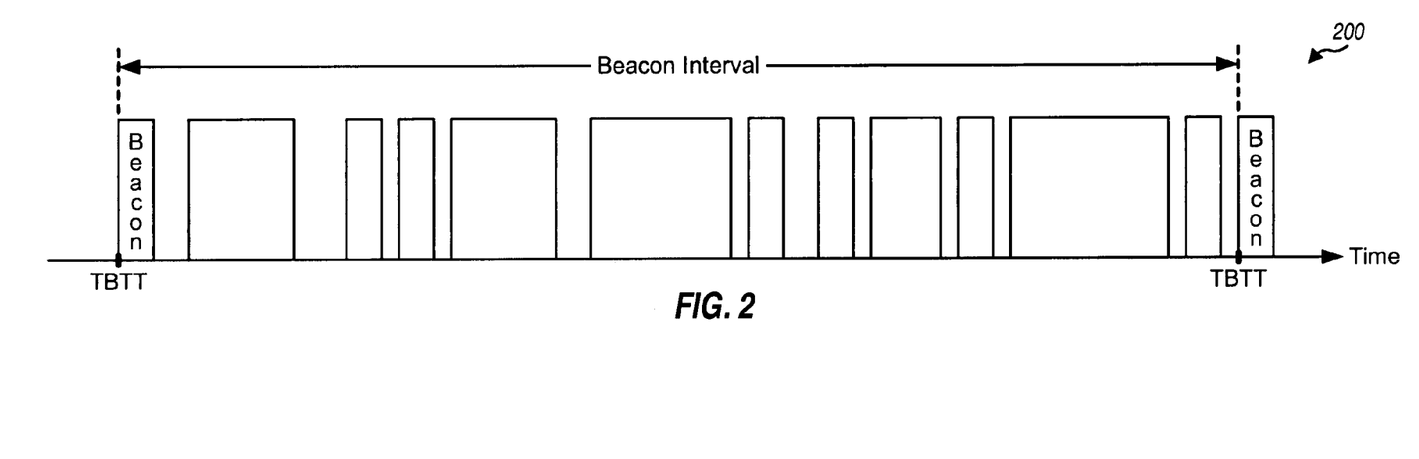
FIG. 2 shows a transmission timeline for WLAN.

FIG. 2 shows an exemplary transmission timeline 200 for WLAN 120 in FIG. 1. Access point 122 in WLAN 120 maintains a timeline for all transmissions covered by the access point. Access point 122 periodically transmits a beacon that carries various types of information for WLAN 120. The beacon is transmitted at a target beacon transmit time (TBTT). The time interval between TBTTs typically includes a contention free period (CFP) in which only one WLAN station transmits on the wireless channel at any given moment and a contention period (CP) in which more than one WLAN station may transmit simultaneously on the wireless channel.

Figure 3:
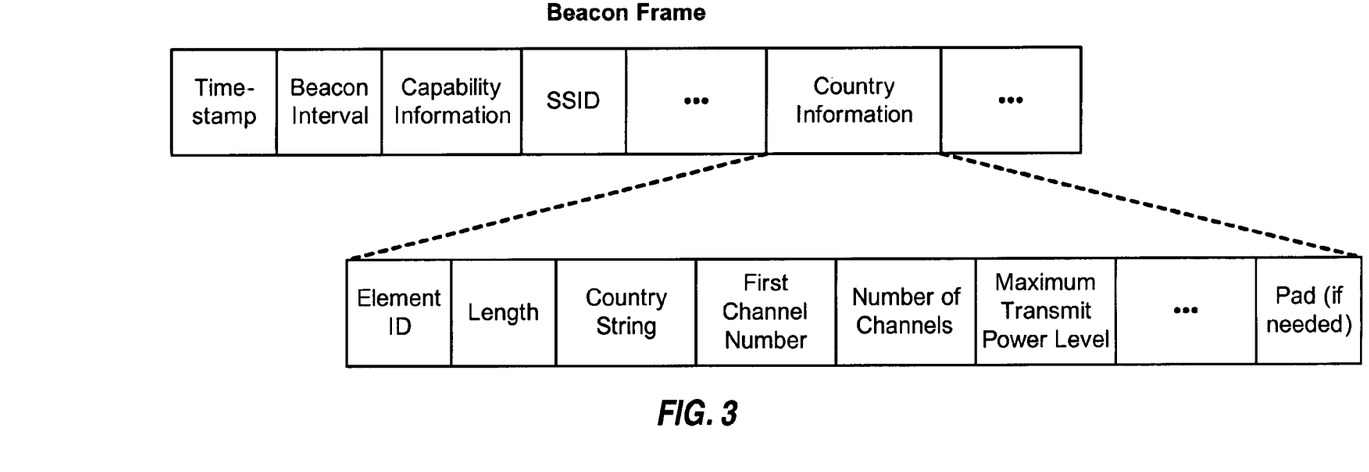
FIG. 3 shows a beacon frame for WLAN.

FIG. 3 shows the format of a beacon frame that is transmitted periodically by access point 122. The beacon frame includes a Timestamp field that indicates the timing of the access point, a Beacon Interval field that indicates the time duration between TBTTs, a Capability Information field that indicates the requested or advertised capabilities of the access point, a Service Set Identity (SSID) field that carries an identifier for the WLAN, and various information elements such as a Country Information element.

FIG. 3 also shows the format of the Country Information element. This information element includes an Element ID field that is set to '7', a Length field that indicates the length of the information element, a Country String field that indicates the country in which the access point resides, a First Channel Number field that indicates the lowest channel number in a subband described in the information element, a Number of Channels field that indicates the number of frequency channels in the subband, and a Maximum Transmit Power Level field that indicates the maximum power allowed to be transmitted. One set of First Channel Number, Number of Channels, and Maximum Transmit Power Level fields is provided for each subband, which is a block of consecutive frequency channels that is not contiguous with another block of frequency channels.

802.11d specifies the operation of a terminal that is enabled for operation across regulatory domains. The terminal is required to default to passive scanning when it has lost connectivity with its extended service set (ESS), which may be WLAN 120. An ESS is a wireless network of arbitrary size that is formed by chaining basic service sets (BSSs) together with a backbone network. A BSS is a group of stations (e.g., access points and terminals) that communicate with each other. 802.11d requires the terminal to passively scan in order to learn at least one valid frequency channel on which 802.11 frames are detected. From a valid frequency channel, the terminal can receive a beacon frame that contains information on the country code, the maximum allowable transmit power, and the frequency channels to be used for the regulatory domain, as shown in FIG. 3. Upon acquiring the regulatory information, the terminal configures the physical layer for operation in the regulator domain. The terminal may then transmit a probe request to an access point on a proper frequency channel and at the proper transmit power level.

The requirement for passive scanning (e.g., upon power up) ensures that the terminal can meet the requirements of the applicable regulatory domain. However, the passive scanning consumes battery power and further results in longer delay in accessing a WLAN, both of which are undesirable.

In an embodiment, a terminal that is capable of communicating with a WWAN (e.g., a cellular network) can receive country information from the WWAN. The terminal may use this country information to ascertain the country in which the terminal is located and to determine the available frequency channel(s) and the maximum transmit power level for that country. The terminal may then bypass the passive scanning and may perform active scan right away to access a WLAN. For the active scan, the terminal may transmit a probe request to an access point on a proper frequency channel and at the proper transmit power level. The ability to perform active scan right away without having to perform passive scan may conserve battery power and may further shorten access time.

A terminal may obtain country information based on a Mobile Country Code (MCC) that is broadcast by a base station in a cellular network. The MCC is defined by the International Telecommunications Union (ITU) as a 3-digit code that identifies the country in which a cellular network is deployed. Each country is assigned one or more unique MCC values by the ITU in Recommendation E.212, which is publicly available. For example, the United States is assigned MCC values of 310 through 316 (decimal). The MCC is broadcast in different manners by different cellular networks.

For a CDMA network that implements cdma2000, which covers IS-95, IS-2000, and IS-856, each base station broadcasts a network operator identifier that is composed of an MCC and a Network Operator Code (NOC). The NOC may be a Mobile Network Code (MNC) defined by the ITU and used for an International Mobile Subscriber Identity (IMSI). A base station may broadcast the MCC in various signaling/overhead messages such as, e.g., a Sync Channel Message on a sync channel, a System Parameters Message on a paging channel, or an Extended System Parameters Message on the paging channel.

Figure 4:
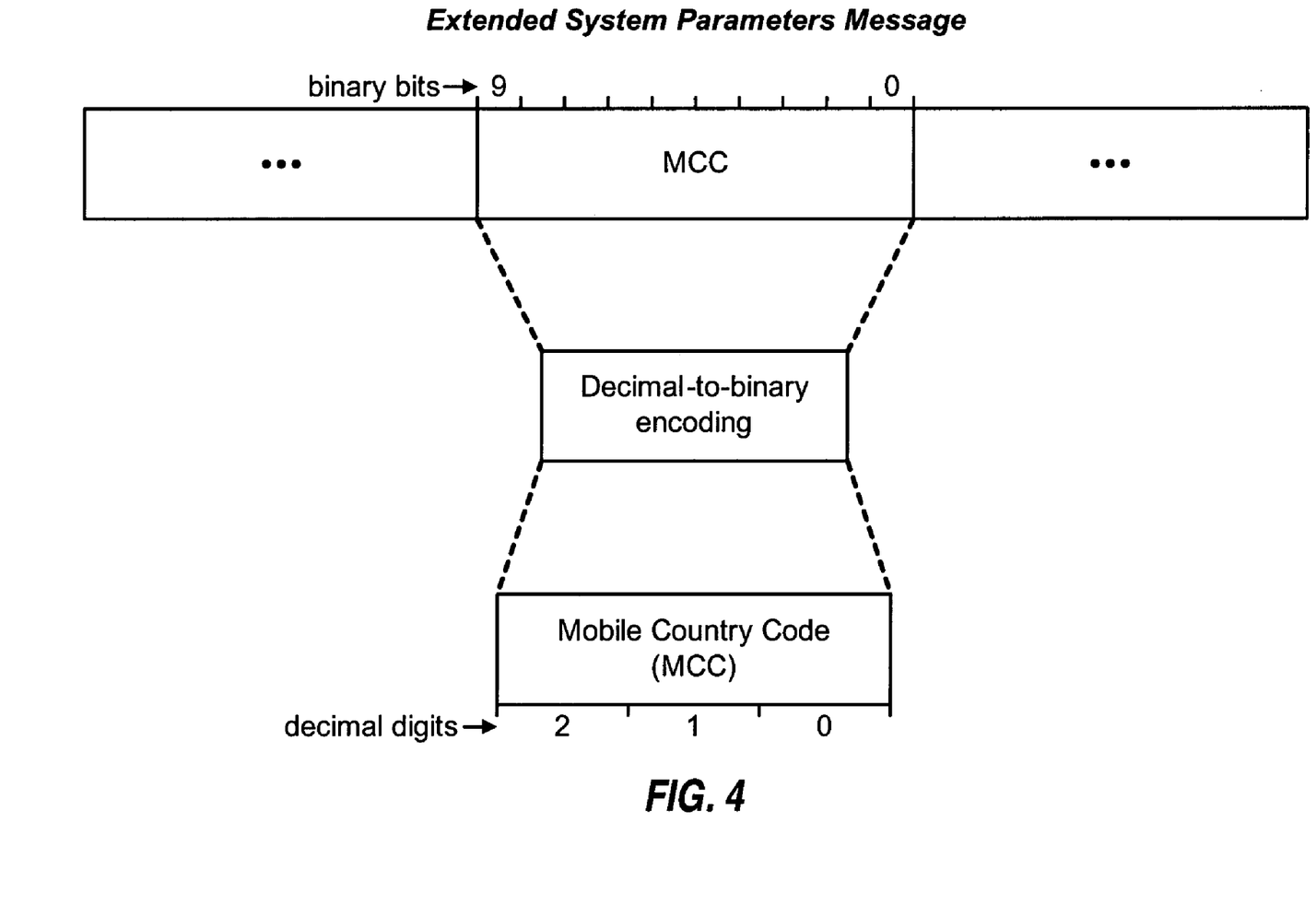
FIG. 4 shows transmission of an MCC in an Extended System Parameters Message in a CDMA network.

FIG. 4 shows transmission of the MCC in an Extended System Parameters Message defined by IS-95 and IS-2000. The Extended System Parameters Message has a number of fields, one of which is an MCC field. The MCC field is a mandatory field and is included in each Extended System Parameters Message transmitted by a base station in a CDMA network. The 10-bit MCC field carries a 3-digit MCC value that indicates the country in which the transmitting base station is located. The encoding of the 3-digit MCC value into a 10-bit binary value for the MCC field is described in 3GPP2 C.S0005-C, entitled "Upper Layer (Layer 3) Signaling Standard for cdma2000 Spread Spectrum Systems," Section 2.3, which is publicly available.

For a GSM network, each base station regularly broadcasts a System Information Type 3 message on a broadcast control channel (BCCH). This message contains a Location Area Identification information element that carries a 3-digit MCC value and a 3-digit MNC value for the GSM network. The System Information Type 3 message and the Location Area Identification information element are described in 3GPP TS 04.18 and 3GPP TS 24.008, respectively, which are publicly available.

For a UMTS network, each base station regularly broadcasts a System Information message on a BCCH. This message contains a Master Information block that carries a PLMN Identity for a Public Land Mobile Network (PLMN) in which the UMTS network belongs. The PLMN Identity is composed of a 3-digit MCC value and a 2 or 3-digit MNC value for the PLMN. The System Information message and the Master Information block are described in 3GPP TS 25.331, which is also publicly available.

A terminal may be configured with a scan setting that indicates how the terminal should scan for a WLAN. In an embodiment, the scan setting may be set to one of the following:

Passive scan—always perform passive scan;
Active scan—always perform active scan without performing passive scan; and
Auto scan—perform active scan without performing passive scan if country information is available and perform passive scan prior to active scan if country information is unavailable.

Active scan may be used, e.g., if the terminal is operating in only one country and the frequency and transmit power requirements for that country are known.

Figure 5:
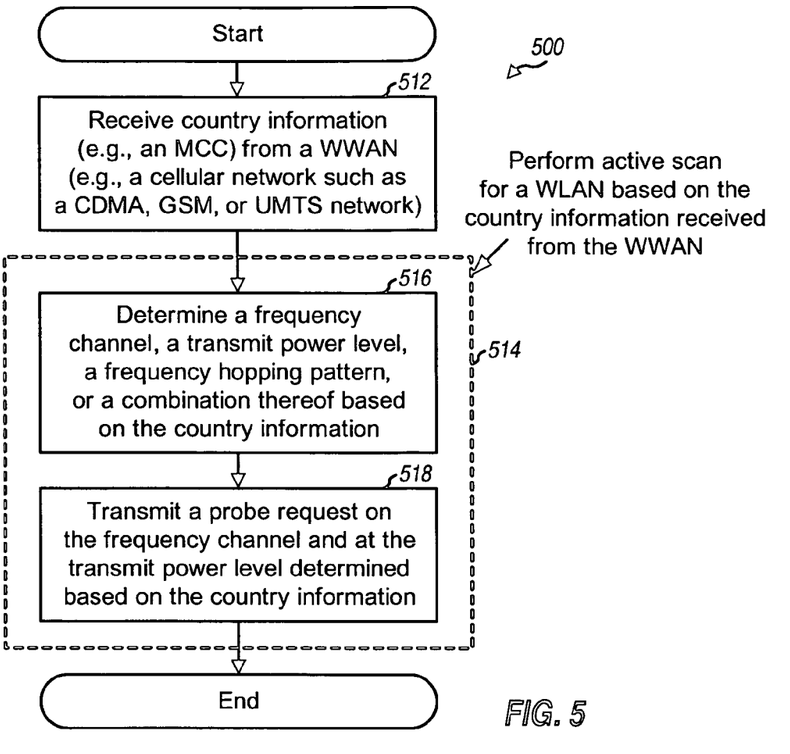
FIG. 5 shows a process to scan for a WLAN based on country information received from a WWAN.

FIG. 5 shows an embodiment of a process 500 performed by a terminal to scan for a WLAN based on country information received from a WWAN. The WWAN may be a cellular network such as a CDMA network, a GSM network, a UMTS network, or some other cellular network.

Initially, e.g., upon being powered up or upon loss of WLAN coverage, the terminal receives country information from the WWAN (block 512). This country information may comprise an MCC that is broadcast in a signaling/overhead message by the WWAN. The terminal then performs active scan for a WLAN based on the country information received from the WWAN (block 514). For the active scan in block 514, the terminal determines a frequency channel, a transmit power level, a frequency hopping pattern, or a combination thereof based on the country information (block 516). The terminal then transmits a probe request/access probe on the frequency channel and at the transmit power level determined based on the country information (block 518). If the access attempt is unsuccessful and the terminal does not receive a probe response, then the terminal may send another probe request on the same frequency channel or on another frequency channel (if any) supported by the country in which the terminal is located.

In an embodiment, the terminal performs active scan without performing passive scan for all access attempts. In another embodiment, the terminal is configured with a scan setting and performs passive scan and/or active scan in accordance with the scan setting. The terminal may perform active scan without performing passive scan for (1) an Active Scan setting and (2) an Auto Scan setting if country information is available. The terminal may perform passive scan followed by active scan for (1) a Passive Scan setting and (2) an Auto Scan setting if country information is unavailable.

In another embodiment, a terminal obtains country information using position determination. The terminal may obtain a position estimate for itself based on measurements for Global Positioning System (GPS) satellites, cellular base stations, and/or other transmitters. The position estimate may be derived using various techniques such as GPS, Advanced Forward Link Trilateration (A-FLT), Uplink Time of Arrival (U-TOA), Enhanced Observed Time Difference (E-OTD), Observed Time Difference of Arrival (OTDOA), Enhanced Cell-ID, Cell-ID, and so on, which are known in the art. The terminal may use it position estimate to determine the country in which it is located and may then determine the available frequency channel(s) and the maximum transmit power level for that country. The terminal may then perform active scan without performing passive scan.

In yet another embodiment, a terminal obtains country information via user input. The terminal may query a user for country information (1) if the terminal cannot acquire a cellular system upon being powered up, (2) every time the terminal is powered up, or (3) in some other manner.

The techniques described herein may also be used to ensure proper operation by a terminal for a WPAN such as a Bluetooth network. Bluetooth can operate in the 2.4 GHz band either from 2400 to 2483.5 MHz (which is called the full Bluetooth band) or from 2446.5 to 2483.5 MHz (which is called the limited Bluetooth band). The full Bluetooth band is applicable for most countries including the United States and is divided into 79 radio frequency (RF) channels that are given indices of 0 through 78. The limited Bluetooth band is applicable for France and is divided into 23 RF channels that are given indices of 0 through 22. Each RF channel is 1 MHz wide.

Bluetooth employs frequency hopping so that a transmission hops across the RF channels in different time slots. Each time slot is 625 microseconds (µs) for Bluetooth. A 79-hop system is used for the full Bluetooth band, and a 23-hop system is used for the limited Bluetooth band. For each Bluetooth piconet that is composed of a master device and up to 7 actively communicating slave devices, a unique frequency hopping pattern indicates a specific RF channel to use in each time slot.

A Bluetooth device may travel from one country to another country. For example, Bluetooth network 130 (which is composed of terminal 132 and headset 134) and/or Bluetooth network 140 (which is composed of terminal 142 and mouse 144) may travel from the United States to France. Each Bluetooth network may operate as a 79-hop system that utilizes all 79 RF channels in the full Bluetooth band while in the United States. Each Bluetooth network would need to operate as a 23-hop system that utilizes the 23 RF channels in the limited Bluetooth band while in France. Terminal 132 and/or 142 may receive an MCC from a WWAN upon being powered up. Terminal 132 and/or 142 may then determine the proper Bluetooth band and may generate the proper frequency hopping pattern based on the MCC. This ensures that each Bluetooth network operates in accordance with the regulatory requirements of the country in which the Bluetooth network is located.

Figure 6:
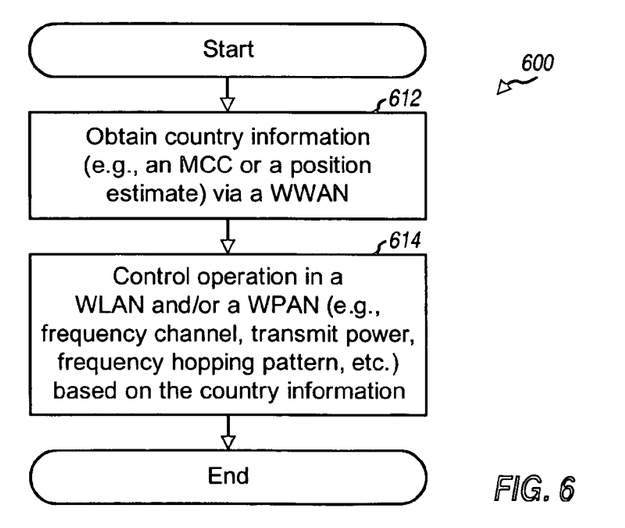
FIG. 6 shows a process to control operation of a terminal in a WLAN and/or WPAN based on country information obtained via a WWAN.

FIG. 6 shows an embodiment of a process 600 performed by a terminal to control operation on a WLAN and/or a WPAN based on country information obtained via a WWAN. The WWAN may be a cellular network such as a CDMA network, a GSM network, a UMTS network, and so on.

Initially, e.g., upon being powered up, the terminal obtains country information via the WWAN (block 612). This country information may comprise an MCC that is broadcast by the WWAN. This country information may also be obtained based on a position estimate for the terminal, which may be obtained via the WWAN. The position estimate may be computed by the terminal based on measurements for base stations in the WWAN and/or other transmitters. The position estimate may also be computed by the WWAN based on measurements for the terminal and sent to the terminal.

The terminal controls operation on the WLAN and/or WPAN based on the country information obtained via the WWAN (block 614). For example, the terminal may determine a frequency range, a transmit power level, a frequency hopping pattern, and so on for the WLAN and/or WPAN based on the country information. For a WLAN that implements IEEE 802.11, the terminal may perform active scan for the WLAN based on the country information. For a WPAN that implements Bluetooth, the terminal may determine a Bluetooth band and may generate a frequency hopping pattern based on the country information.

Figure 7:
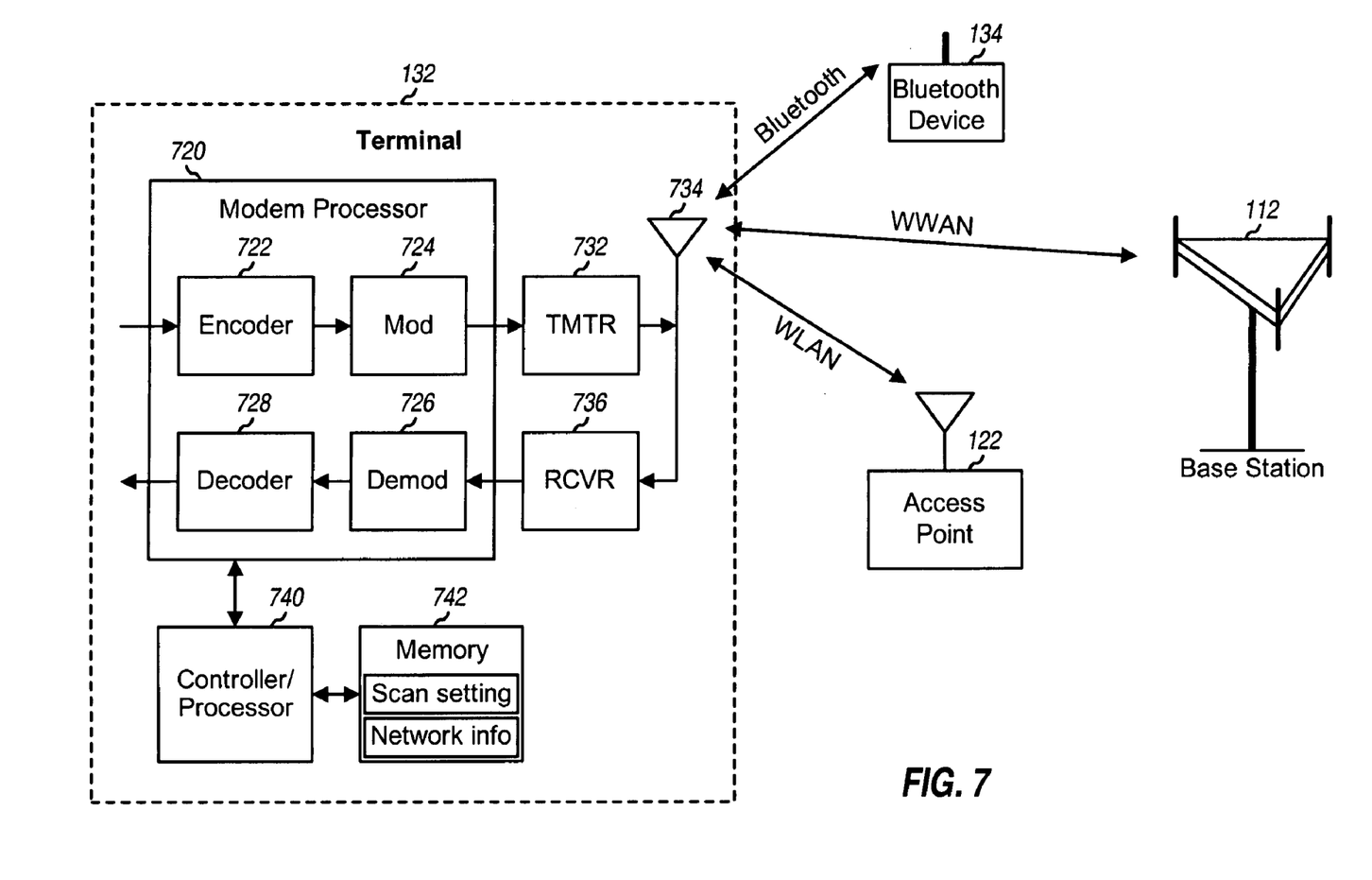
FIG. 7 shows a block diagram of a terminal.

FIG. 7 shows a block diagram of an embodiment of terminal 132, which is capable of communicating with multiple wireless networks such as a WWAN (e.g., a cellular network), a WLAN, and a WPAN. On the transmit path, data to be sent by terminal 132 to a base station in a WWAN, a Bluetooth device, or a WLAN station is processed (e.g., formatted, encoded, and interleaved) by an encoder 722 and further processed (e.g., modulated and scrambled) by a modulator (Mod) 724 to generate data chips. In general, the processing by encoder 722 and modulator 724 is determined by the wireless network for which data is sent (e.g., cdma2000, GSM, UMTS, Bluetooth, 802.11b, 802.11g, and so on). A transmitter (TMTR) 732 conditions (e.g., converts to analog, filters, amplifies, and frequency upconverts) the data chips and generates an RF output signal, which is transmitted via an antenna 734.

On the receive path, RF signals transmitted by one or more base stations, one or more Bluetooth devices (e.g., headset 134), and/or one or more WLAN stations (e.g., access point 122) are received by antenna 734 and provided to a receiver (RCVR) 736. Receiver 736 conditions (e.g., filters, amplifies, frequency downconverts, and digitizes) the received signal and generates data samples. A demodulator (Demod) 726 processes (e.g., descrambles and demodulates) the data samples to obtain symbol estimates. A decoder 728 processes (e.g., deinterleaves and decodes) the symbol estimates to obtain decoded data. In general, the processing by demodulator 726 and decoder 728 is complementary to the processing performed by the modulator and encoder at the transmitting entity. Encoder 722, modulator 724, demodulator 726 and decoder 728 may be implemented by a modem processor 720.

A controller/processor 740 directs the operation of various processing units at terminal 132. A memory 742 stores program codes and data for terminal 132. Controller/processor 740 may implement process 500 and/or 600 in FIGS. 5 and 6. Memory 742 may store information (network info) for one or more wireless networks such as 802.11-based network, Bluetooth network, and so on. The network information may indicate the frequency channels, frequency ranges, transmit power levels, and/or other parameters (e.g., Tables 1 and 2) that may be different for different countries/regulatory domains. Memory 742 may also store a table of MCC values and the associated countries. Memory 742 may also store the scan setting for terminal 132.

The techniques described herein may be implemented by various means. For example, these techniques may be implemented in hardware, firmware, software, or a combination thereof. For a hardware implementation, the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 742 in FIG. 7) and executed by a processor (e.g., processor 740). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to:
        determine country information based on a geographic position estimate or receive the country information from a wireless wide area network (WWAN) in order to bypass performing a passive scan in a wireless local area network (WLAN);
        determine a first parameter set of a frequency channel, a transmit power level, and a frequency hopping pattern for the WLAN based on the country information;
        determine a second parameter set of a frequency channel, a transmit power level, and a frequency hopping pattern for a wireless personal area network (WPAN) based on the country information;
        control operation of the apparatus in the WLAN based on the first parameter set of the frequency channel, the transmit power level, and the frequency hopping pattern for the WLAN;
        control operation of the apparatus in the WPAN based on the second parameter set of the frequency channel, the transmit power level, and the frequency hopping pattern for the WPAN;
    a scan setting selector configured to select one of a passive scan setting, an active scan setting and an auto scan setting; and
    a memory coupled to the at least one processor;
    wherein the at least one processor is configured to perform an active scan for the WLAN based on the country information when the active scan setting is selected.

2. The apparatus of claim 1, wherein the at least one processor is configured to transmit a probe request on the frequency channel and at the transmit power level for the WLAN determined based on the country information.

3. The apparatus of claim 1, wherein the at least one processor is configured to perform the active scan without performing a passive scan if the country information is available.

4. The apparatus of claim 1, wherein the at least one processor is configured to perform a passive scan for the passive scan setting, and to perform the active scan without performing the passive scan for the auto scan setting if the country information is available.

5. The apparatus of claim 1, wherein the country information is based on a Mobile Country Code (MCC) received from the WWAN.

6. The apparatus of claim 5, wherein the WWAN is a Code Division Multiple Access (CDMA) network, and wherein the at least one processor is configured to receive a Sync Channel Message, a System Parameters Message, or an Extended System Parameters Message from the CDMA network, and to extract the MCC from the received Sync Channel message.

7. The apparatus of claim 5, wherein the WWAN is a Global System for Mobile Communications (GSM) network, and wherein the at least one processor is configured to receive a System Information Type 3 message from the GSM network, and to extract the MCC from the received System Information Type 3 message.

8. The apparatus of claim 5, wherein the WWAN is a Universal Mobile Telecommunication System (UMTS) network, and wherein the at least one processor is configured to receive a System Information message from the UMTS network, and to extract the MCC from the received System Information message.

9. The apparatus of claim 1, wherein the WWAN is a broadcast network.

10. The apparatus of claim 1, wherein the at least one processor is configured to obtain via the WWAN a position estimate for the apparatus, and to obtain the country information based on the position estimate.

11. The apparatus of claim 1, wherein the at least one processor is configured to determine a frequency range of operation for the WLAN or WPAN based on the country information.

12. The apparatus of claim 1, wherein the at least one processor is configured to receive the country information based on a position estimate for the apparatus obtained via the WWAN.

13. The apparatus of claim 1, wherein the country information is determined based on the geographic position estimate, wherein the geographic position estimate is determined based on measurements obtained via at least one of a Global Positioning System (GPS), Advanced Forward Link Trilateration (A-FLT), Uplink Time of Arrival (U-TOA), Enhanced Observed Time Difference (E-OTD), Observed Time Difference of Arrival (OTDOA), and Cell-ID.

14. A method comprising:
    determining country information based on a geographic position estimate or based on receiving the country information from a wireless wide area network (WWAN) in order to bypass performing a passive scan in a wireless local area network (WLAN);

determining a first parameter set of a frequency channel, a transmit power level, and a frequency hopping pattern for the WLAN based on the country information;

determining a second parameter set of a frequency channel, a transmit power level, and a frequency hopping pattern for a wireless personal area network (WPAN) based on the country information;

controlling operation of a terminal in the WLAN based on the first parameter set of the frequency channel, the transmit power level, and the frequency hopping pattern for the WLAN;

controlling operation of the terminal in the WPAN based on the second parameter set of the frequency channel, the transmit power level, and the frequency hopping pattern for the WPAN;

selecting one of a passive scan setting, an active scan setting and an auto scan setting; and performing an active scan for the WLAN based on the country information when the active scan setting is selected.

15. The method of claim 14, wherein the receiving the country information comprises receiving a Mobile Country Code (MCC) from the WWAN.

16. The method of claim 14, further comprising transmitting a probe request on the frequency channel and at the transmit power level for the WLAN determined based on the country information.

17. The method of claim 14, wherein the performing the active scan for the WLAN comprises performing the active scan without performing a passive scan if the country information is available when the auto scan setting is selected.

18. The method of claim 14, wherein the controlling the operation of the terminal further comprises determining a frequency range of operation for the WLAN or WPAN based on the country information.

19. The method of claim 14, wherein the country information is based on a position estimate for the apparatus obtained via the WWAN.

20. The method of claim 14, wherein the country information is determined based on the geographic position estimate, wherein the geographic position estimate is determined based on measurements obtained via at least one of a Global Positioning System (GPS), Advanced Forward Link Trilateration (A-FLT), Uplink Time of Arrival (U-TOA), Enhanced Observed Time Difference (E-OTD), Observed Time Difference of Arrival (OTDOA), and Cell-ID.

21. An apparatus comprising:
means for:
  determining country information based on a geographic position estimate or the country information received from a wireless wide area network (WWAN) in order to bypass performing a passive scan in a wireless local area network (WLAN);
  determining a first parameter set of a frequency channel, a transmit power level, and a frequency hopping pattern for the WLAN based on the country information;
  determining a second parameter set of a frequency channel, a transmit power level, and a frequency hopping pattern for a wireless personal area network (WPAN) based on the country information;
  controlling operation of the apparatus in the WLAN based on the first parameter set of the frequency channel, the transmit power level, and the frequency hopping pattern for the WLAN;
  controlling operation of the apparatus in the WPAN based on the second parameter set of the frequency channel, the transmit power level, and the frequency hopping pattern for the WPAN;
  selecting one of a passive scan setting, an active scan setting and an auto scan setting;
  performing an active scan for the WLAN based on the country information when the active scan setting is selected; and
means for storing the country information.

22. The apparatus of claim 21, further comprising means for receiving a Mobile Country Code (MCC) from the WWAN.

23. The apparatus of claim 21, further comprising means for transmitting a probe request on the frequency channel and at the transmit power level for the WLAN determined based on the country information.

24. The apparatus of claim 21, wherein the active scan is performed without performing a passive scan if the country information is available when the auto scan setting is selected.

25. A memory having computer executable codes stored thereon the memory comprising:
  a first set of codes for causing a processor to determine country information based on geographic position estimate or to receive the country information from a wireless wide area network (WWAN) in order to bypass performing a passive scan in a wireless local area network (WLAN);
  a second set of codes for causing the processor to determine a first parameter set of a frequency channel, a transmit power level, and a frequency hopping pattern for the WLAN based on the country information;
  a third set of codes for causing the processor to determine a second parameter set of a frequency channel, a transmit power level, and a frequency hopping pattern for a wireless personal area network (WPAN) based on the country information;
  a fourth set of codes for causing the processor to control operation of a terminal in the WLAN based on the first parameter set of the frequency channel, the transmit power level, and the frequency hopping pattern for the WLAN;
  a fifth set of codes for causing the processor to control operation of the terminal in the WPAN based on the second parameter set of the frequency channel, the transmit power level, and the frequency hopping pattern for the WPAN;
  a sixth set of codes for causing the processor to select one of a passive scan setting, an active scan setting and an auto scan setting; and
  a seventh set of codes for causing the processor to perform an active scan for the WLAN based on the country information when the active scan setting is selected.

26. The memory of claim 25, wherein the country information is based on a Mobile Country Code (MCC) received from the WWAN.

* * * * *